(12) United States Patent
Fuller

(10) Patent No.: US 8,307,849 B2
(45) Date of Patent: Nov. 13, 2012

(54) ROTARY COUPLER AND METHOD OF USING SAME

(75) Inventor: Harry P. Fuller, Newbury, OH (US)

(73) Assignee: Jergens, Inc., Cleveland, OH (US)

( * ) Notice: Subject to any disclaimer, the term of this patent is extended or adjusted under 35 U.S.C. 154(b) by 542 days.

(21) Appl. No.: 12/473,336

(22) Filed: May 28, 2009

(65) Prior Publication Data

US 2009/0293970 A1    Dec. 3, 2009

Related U.S. Application Data

(60) Provisional application No. 61/130,915, filed on Jun. 3, 2008.

(51) Int. Cl.
*F16L 27/087* (2006.01)
*F16L 37/53* (2006.01)
*F16L 39/04* (2006.01)

(52) U.S. Cl. .......................... 137/580; 137/596; 137/884

(58) Field of Classification Search ................ 137/580, 137/625.28, 596, 597, 883, 884
See application file for complete search history.

(56) References Cited

U.S. PATENT DOCUMENTS

| | | | | |
|---|---|---|---|---|
| 2,831,651 A * | 4/1958 | Hutchings | ..................... | 251/270 |
| 3,581,812 A * | 6/1971 | Fleissner et al. | ................ | 165/89 |
| 3,738,423 A * | 6/1973 | Fleissner | ........................ | 165/89 |
| 3,831,666 A * | 8/1974 | Fleissner | ........................ | 165/89 |
| 4,478,247 A * | 10/1984 | Alber | ............................. | 137/580 |
| 4,564,043 A * | 1/1986 | Trittler | ..................... | 137/624.18 |
| 4,605,249 A | 8/1986 | Klievoneit et al. | | |
| 4,921,010 A * | 5/1990 | Spirer | ........................... | 137/580 |
| 5,439,029 A * | 8/1995 | Becker | .......................... | 137/580 |
| 5,871,315 A | 2/1999 | Burt et al. | | |
| 5,971,020 A * | 10/1999 | Raque et al. | ............ | 137/625.11 |
| 6,406,065 B1 * | 6/2002 | Ott et al. | ..................... | 285/120.1 |
| 6,470,547 B2 | 10/2002 | Burge et al. | | |
| 6,753,822 B2 * | 6/2004 | Tietjen | ......................... | 343/757 |
| 6,938,435 B2 * | 9/2005 | Goseling et al. | ................ | 62/342 |
| 2005/0126640 A1 * | 6/2005 | Albrigo | ......................... | 137/580 |

OTHER PUBLICATIONS

Jergens, Inc. catalog relating to production vises, pp. 1-27.
Deublin coupling catalog, pp. 47-49.

* cited by examiner

*Primary Examiner* — John Rivell
*Assistant Examiner* — Jonathan Waddy
(74) *Attorney, Agent, or Firm* — Rankin, Hill & Clark LLP

(57) ABSTRACT

A rotary coupler for directing a fluid between a fluid supply and fixtures rotatable about a fixture axis and which has a manifold plate directing the fluid from a manifold inlet and a manifold outlet to the fixtures positioned about the fixture axis, the coupler including a spindle having a base portion and a shaft portion and the shaft portion defines a coupler axis and has a shaft surface generally coaxial to the coupler axis and the shaft surface includes an annular pressure zone and an axially spaced annular tank zone, the spindle also includes an internal pressurized fluid passage and an internal tank fluid passage wherein the pressurized passage extends within the spindle the coupler further includes a hub with a shaft opening shaped to receive the shaft portion, the manifold having control valves for selective actuation of the fixturing.

15 Claims, 8 Drawing Sheets

ROTARY COUPLER AND METHOD OF USING SAME

This application claims priority to and the benefit of the filing date of U.S. Provisional Patent Application Ser. No. 61/130,915 filed Jun. 3, 2008, which application is incorporated herein by reference in its entirety.

The invention of this application relates to rotary couplers and more particularly, is directed to a rotary coupler or coupling for directing a fluid flow between a pressurized supply of fluid and a fixturing device.

INCORPORATION BY REFERENCE

U.S. Pat. No. 6,470,547 discloses a rotary coupling reference no. 50 and associated machining stations. The '547 patent is incorporated by reference herein for showing the same. U.S. Pat. No. 5,971,020 discloses a rotary coupling for an article handler. The '020 patent is also incorporated by reference herein for showing the same. U.S. Pat. No. 4,605,249 discloses a rotary coupling for fluids and is incorporated by reference herein for showing the same. U.S. Pat. No. 5,871,315 discloses a tombstone fixture and is incorporated by reference herein. Also incorporated by reference herein are selected pages from Jergens, Inc.'s catalog relating to production vices. All of these incorporated by reference documents form part of the specification of this application.

Also incorporated by reference herein are three pages from a Deublin coupling catalog showing a hydraulic rotary coupling and two air rotary couplings.

BACKGROUND OF THE INVENTION

The invention of this application relates to rotary couplings or couplers and more particularly to a rotary coupler configured to use in connection with a tooling fixture. While it has been found that the rotary coupler of this application works particularly well in connection with fixtures and fixturing and thus will be described with reference thereto, the rotary coupler of this application has broader applications wherein this application should not be limited to fixturing arrangements.

Rotary couplers are known in the field and are utilized to direct some form of flow, such as electrical or fluid flow, between a stationary source and a rotating object. As referenced above, this application is directed to a fluid flow between a pressurized fluid source and a rotating fixture which utilizes this pressurized fluid to clamp a workpiece to the fixturing. This can be utilized for a wide range of manufacturing operations including, but not limited to, fixtures configured to hold a workpiece, or a plurality of workpieces, for a machining operation such as a computer controlled machining operation (CNC). The fixture utilized in CNC machining can be a multi-sided fixture having, for example, four sides and each of these sides having a clamping device configured to clamp one or more workpieces to the fixture. Each of these sides can also include a separate valve for controlling the clamping of the fixture on the particular side.

In operation, the operator of the machining center would load one or more parts into one side of the fixture at a time. Once the parts are loaded in this first side, a valve would be opened to allow the pressurized fluid to enter that side of the fixture and to actuate the clamps to lock the workpieces in place. The operator would then rotate the fixture 90°, for a four sided fixture, to align themselves with the second side of the fixture. Once in place, the operator can load workpieces in the fixture in the second side. This process continues until all sides of the fixture have been loaded. Once all sides are loaded, the fixture can be moved into a machining position wherein the four sides of the fixture can be machined.

In one particular machining operation, the CNC machine can have two stations wherein one station is a load station and the other station is a machining station. These two stations can be separated by a barrier wall to protect the operator who is loading the fixture in the loading station from the machining operation at the other station. Once the fixturing is moved into the loading station, the operator attaches fluid lines to the fixturing to allow the actuation of the clamps or holding devices on the four sides of the fixturing. Once the lines are connected, the operator can actuate the clamps and unload the machined workpieces from each side and replace them with raw workpieces for machining. Once all four sides are unloaded and then re-loaded, the operator removes the hydraulic lines and the fixturing is ready for machining. As can be appreciated, the constant removing and connecting of the fluid lines makes it such that quick connects are utilized to connect these fluid lines to the fixturing.

In prior art workholding devices, the operator must actuate a manual shut-off valve in the pressurized fluid line between an opened and a closed position before the hydraulic lines could be removed. Similarly, when the fixture is moved to the loading station, the operator first connects the fluid lines to the fixture and then must open this main valve to allow the actuation of each individual fixtures. At that time, the operator proceeds as is described above. Then, once the fixtures are loaded, the operator again turns off the main valve and then removes the fluid lines from the fixture.

With reference to FIGS. 1 and 2, a prior art fixturing arrangement is shown. FIG. 1 shows a prior art coupling device CD joined to a four-sided fixture F. Fixture F includes a top plate TP which is a horizontally positioned top plate. Coupling device CD includes a rotary coupler RC having a hub H and a base B. Pressure line PL and tank line TL are permanently fixed to the ports P in hub H. Base portion B of the rotary coupler includes a tank line outlet TLO for tank feed line TFL which is permanently joined to base B and which includes a quick connect coupling device QCT on its opposite end to selectively connect tank feed line TFL to a tank line connector TLC which is mounted to top plate TP. The flow of pressurized fluid from pressure line PL is also selectively connectable by way of quick connect QCP. QCP includes a quick connect QC1 joined to base B which can be selectively connected with a quick connect QC2 wherein quick connect QC2 is permanently joined to a main valve MV on the top side of the main valve. The bottom side of the main valve is joined to top plate TP providing the fluid with connection of the pressure line to fixture F. Once the component parts are loaded onto all four sides of fixture F, the quick connect for both of the tank line and pressure line QCT are removed and the fixture can then be indexed into the machining position of the machining center which is best shown in FIG. 2.

As can be seen in these figures, the coupling device CD has a height HT that extends a significant distance above top plate TP of the fixturing which can make use of this coupling device very difficult. Further, in some applications, this coupler arrangement cannot be used in that it will not fit within the enclosure of the machining center. This particular coupling device arrangement is approximately 1.5 feet tall. In this respect, rotary coupler RC is over 7" long and it makes up only a fraction of the overall height of coupling device CD.

In operation, once fixture F reaches the loading station, quick connect QC1 must be connected to quick connect QC2 to provide the fluid connection for the pressure line in this system. Then, tank feed line TFL must be joined to tank line connector TLC. Once these two connections are made, valve handle VH of main valve MV is turned to an opened position to allow the pressurized fluid to flow into fixture F. At this time, the operator can unload and load new workpieces on each side of fixture F. Once each side of the fixture is loaded, the operator must then close main valve MV by actuating valve VH. Then, the operator would remove the connection of the tank line and the connection for the pressure line thereby removing the top portion of the coupling device which must then be moved out of the way while the operator closes the machining door and indexes the system. As can be appreciated, this large object that the operator must handle is clumsy and the several connections and manual valve operations are time consuming. As a result, while the coupling device CD can be used to effectively clamp workpieces, it is inefficient and cannot be used for all machining operations.

SUMMARY OF INVENTION

In accordance with the present invention, provided is a rotary coupler for directing a fluid flow between an associated supply of pressurized fluid and an associated fixture.

In this respect, provided is a rotary coupler for directing a fluid flow between a supply of pressurized fluid and a fixture which is rotatable about a fixture axis and which has a manifold plate directing the fluid flow from a manifold inlet and a manifold outlet to a plurality of stations on the fixture positioned about the fixture axis. The coupler including a spindle having a base portion and a shaft portion and which extends in an axial direction from a mounting end on the base portion and a distal end on the shaft portion. The base has a mounting face and a securing arrangement configured to secure the mounting face to a manifold plate such that the mounting face sealingly engages the manifold plate. The shaft portion defines a coupler axis and has a shaft surface generally coaxial to the coupler axis and the shaft surface includes an annular pressure zone and an axially spaced annular tank zone. The spindle also includes an internal pressurized fluid passage and an internal tank fluid passage wherein the pressurized passage extends within the spindle between a pressurized face opening in the mounting face and a pressurized shaft opening in the pressure zone. The pressurized passage includes a check valve limiting fluid flow from said face opening to said shaft opening. The tank passage also extends within the spindle between a tank face opening in the mounting face and a tank shaft opening in the tank zone. The mounting face includes an annular recess and the tank face opening is with this recess such that fluid flow reaching the recess is directed into the tank passage. The coupler further includes a hub with a shaft opening shaped to receive the shaft portion of the spindle such that the hub rotates about the shaft and the coupler axis, at least one of the hub and the shaft has an annular pressure zone channel in the pressure zone allowing the pressurized fluid to flow about the shaft in the pressure zone. In addition, at least one of the hub and the shaft includes an annular tank zone channel in the tank zone allowing the tank fluid to flow about the shaft in the tank zone. The coupler further including a seal separating the tank zone from the pressure zone and the hub has a pressure port and a tank port. The pressure port is the hub is in fluid connection with the pressure zone and the tank port is in fluid connection with the tank zone. The coupler further including a bearing arrangement between the spindle and the hub.

BRIEF DESCRIPTION OF THE DRAWINGS

The foregoing, and more, will in part be obvious and in part be pointed out more fully hereinafter in conjunction with a written description of preferred embodiments of the present invention illustrated in the accompanying drawings in which.

DESCRIPTION OF PREFERRED EMBODIMENTS

Figure 1:
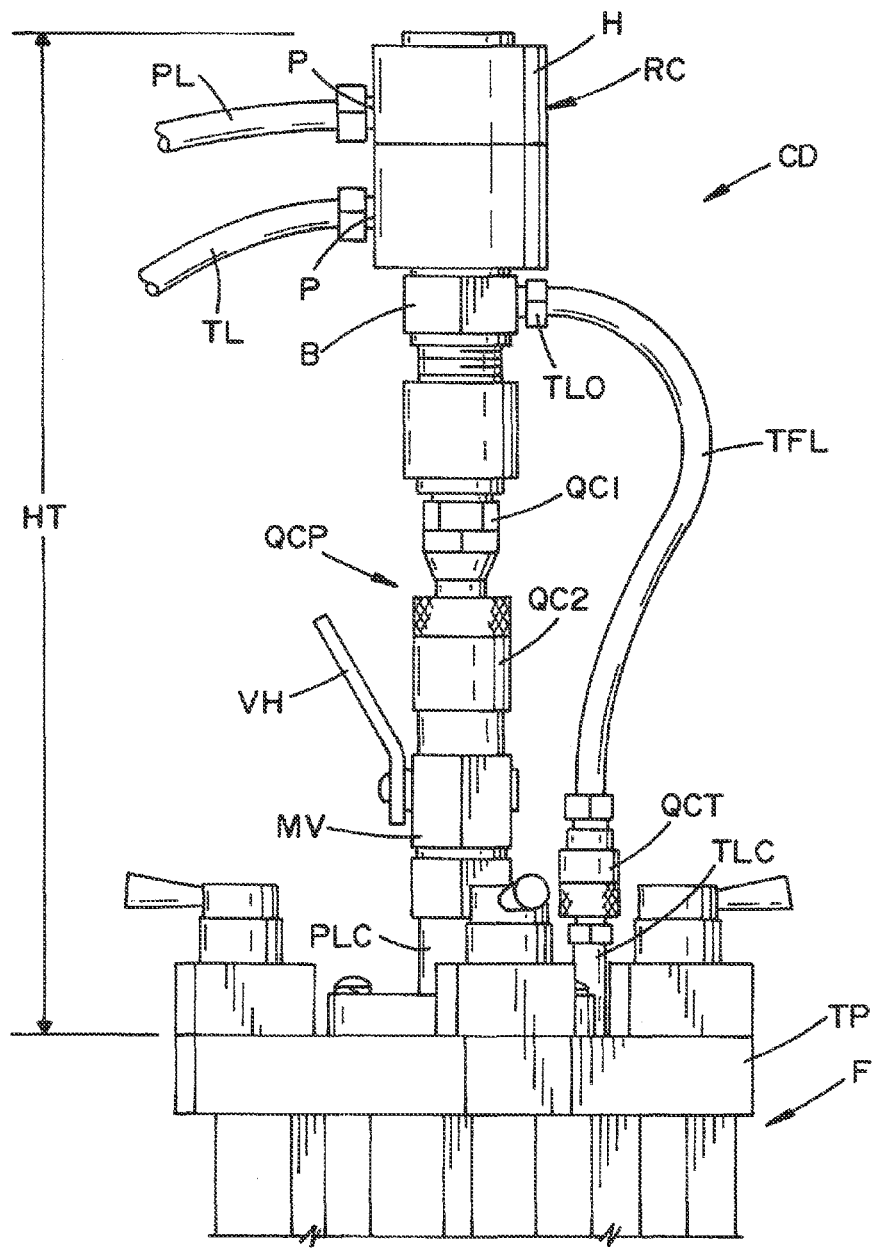
FIG. 1 is an elevational view of a prior art rotary coupling used in connection with a tooling fixture shown in a connected position.
Figure 2:
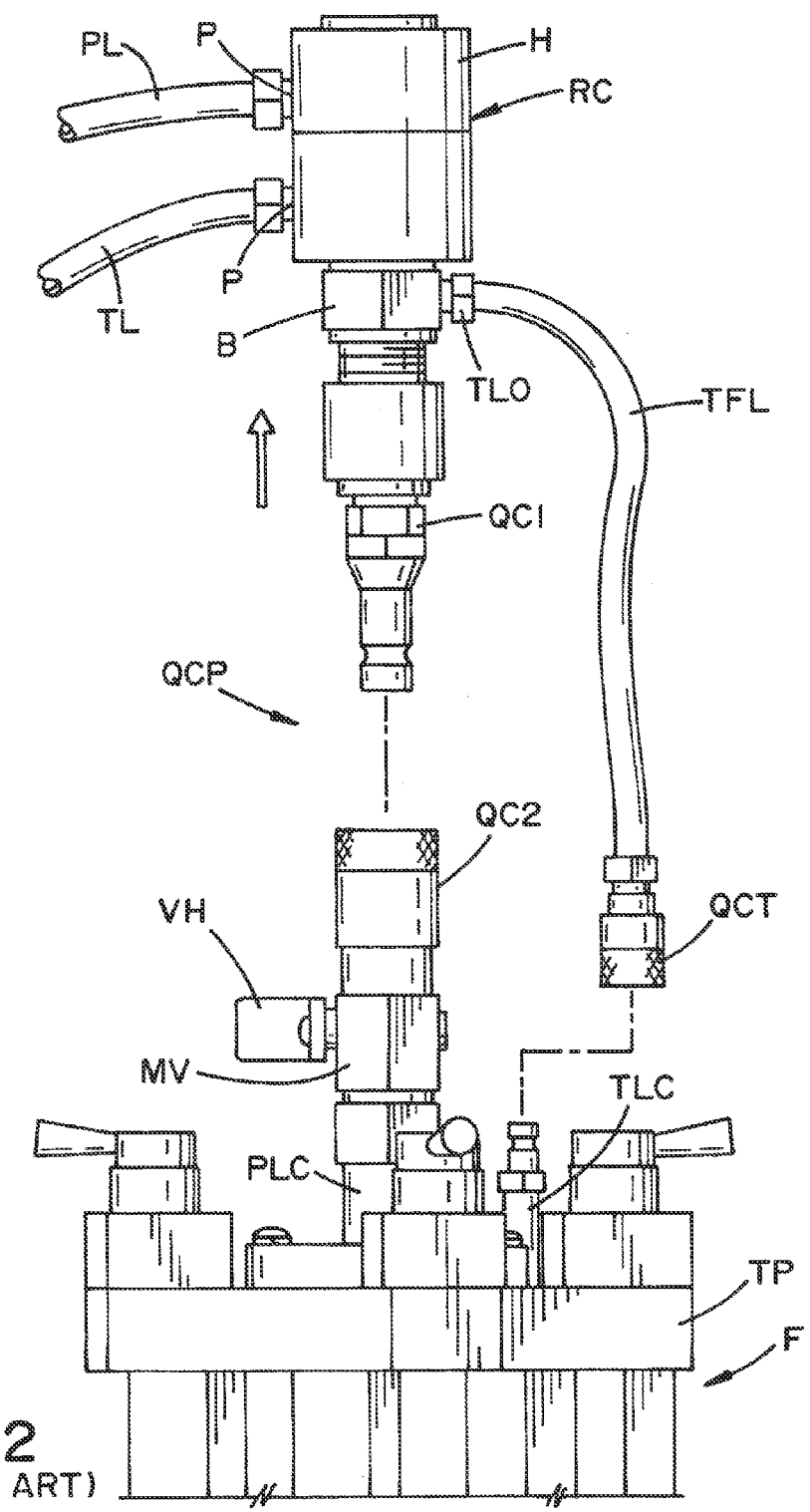
FIG. 2 is an exploded elevational view of the coupler and fixture shown in FIG. 1 in a disconnected condition.
Figure 3:
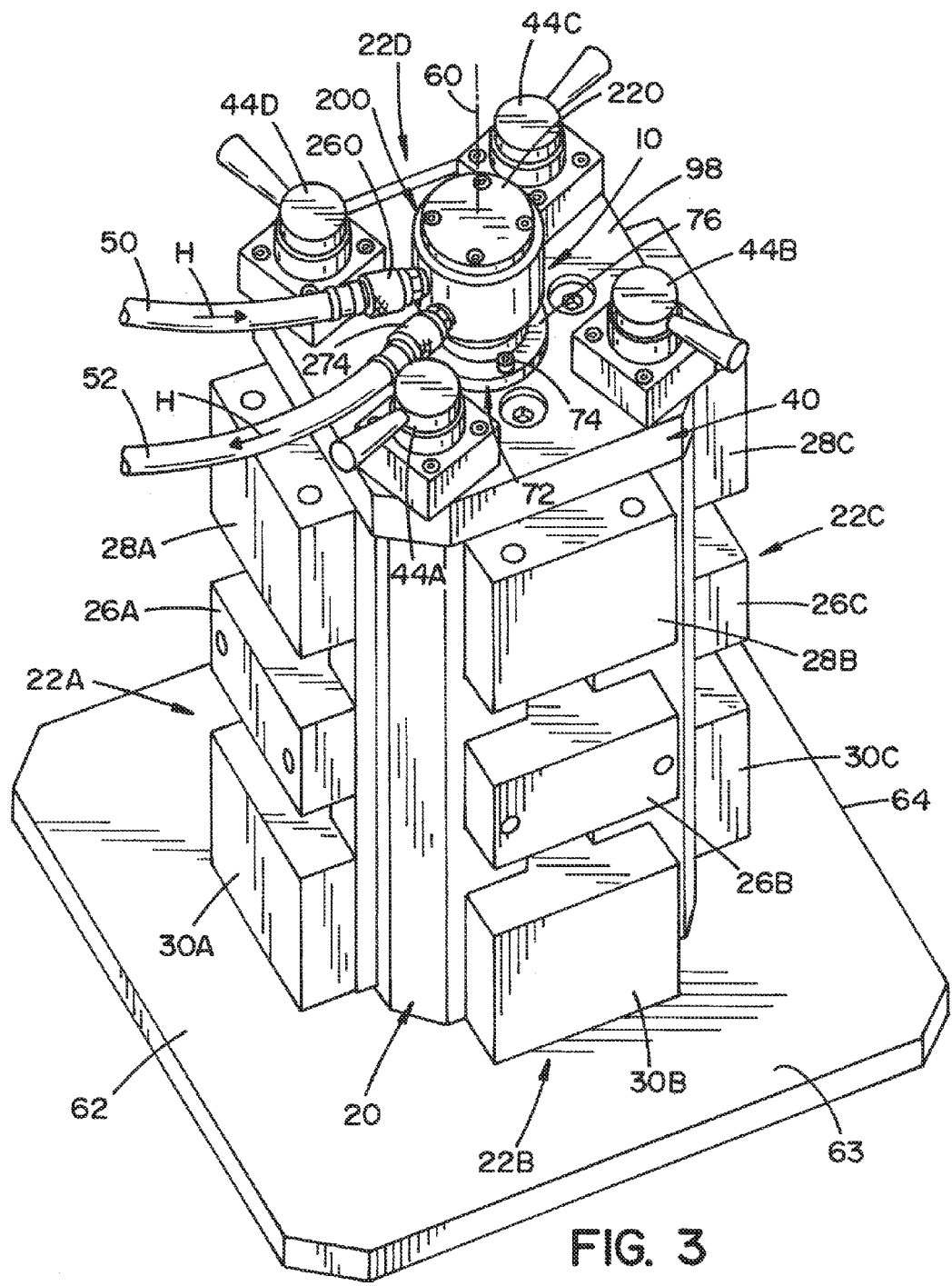
FIG. 3 is a perspective view of a rotary coupler according to the present invention joined to a rotating fixture.
Figure 4:
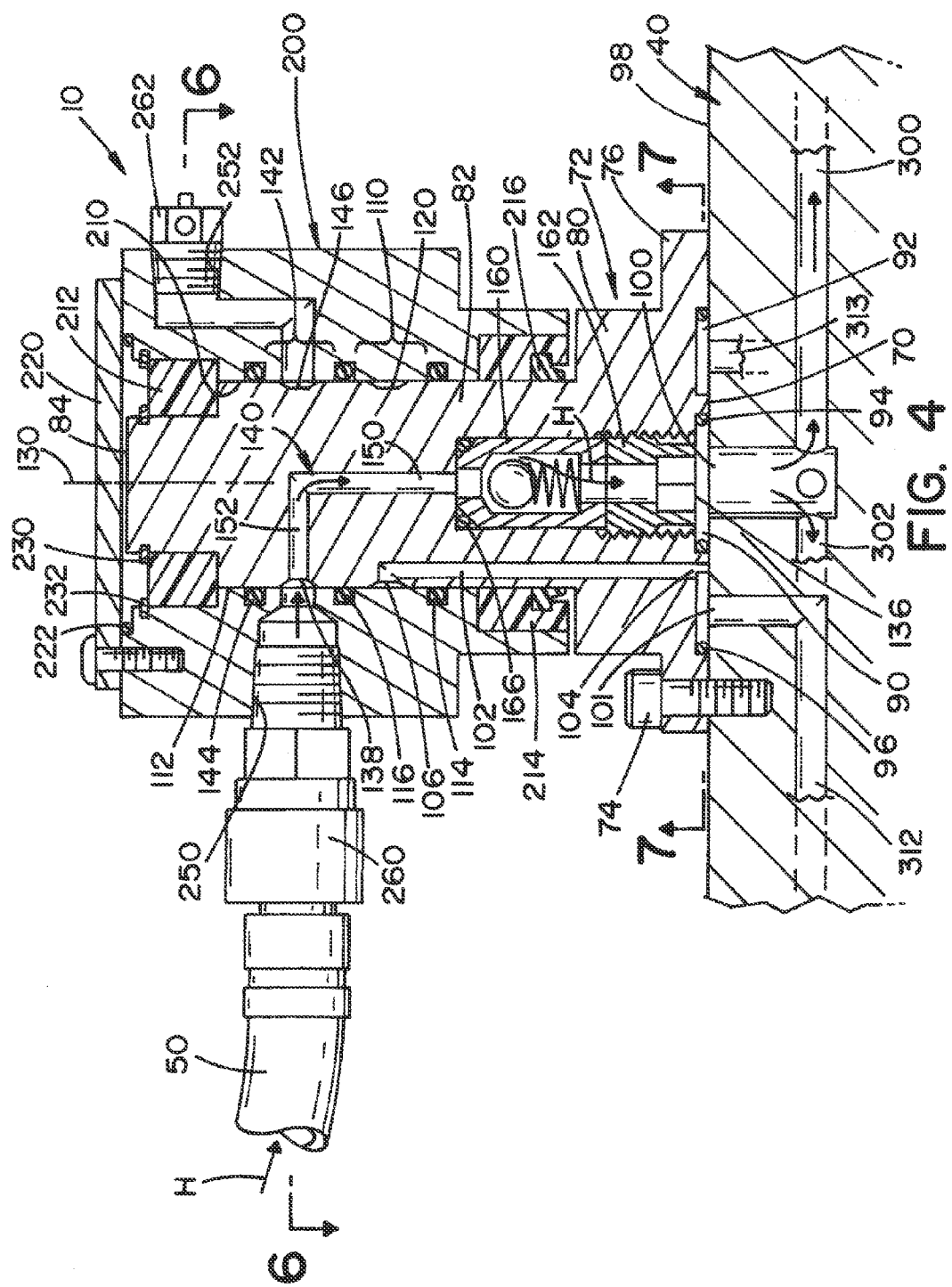
FIG. 4 is a partial sectional view of the rotary coupler and the top plate shown in FIG. 3.
Figure 5:
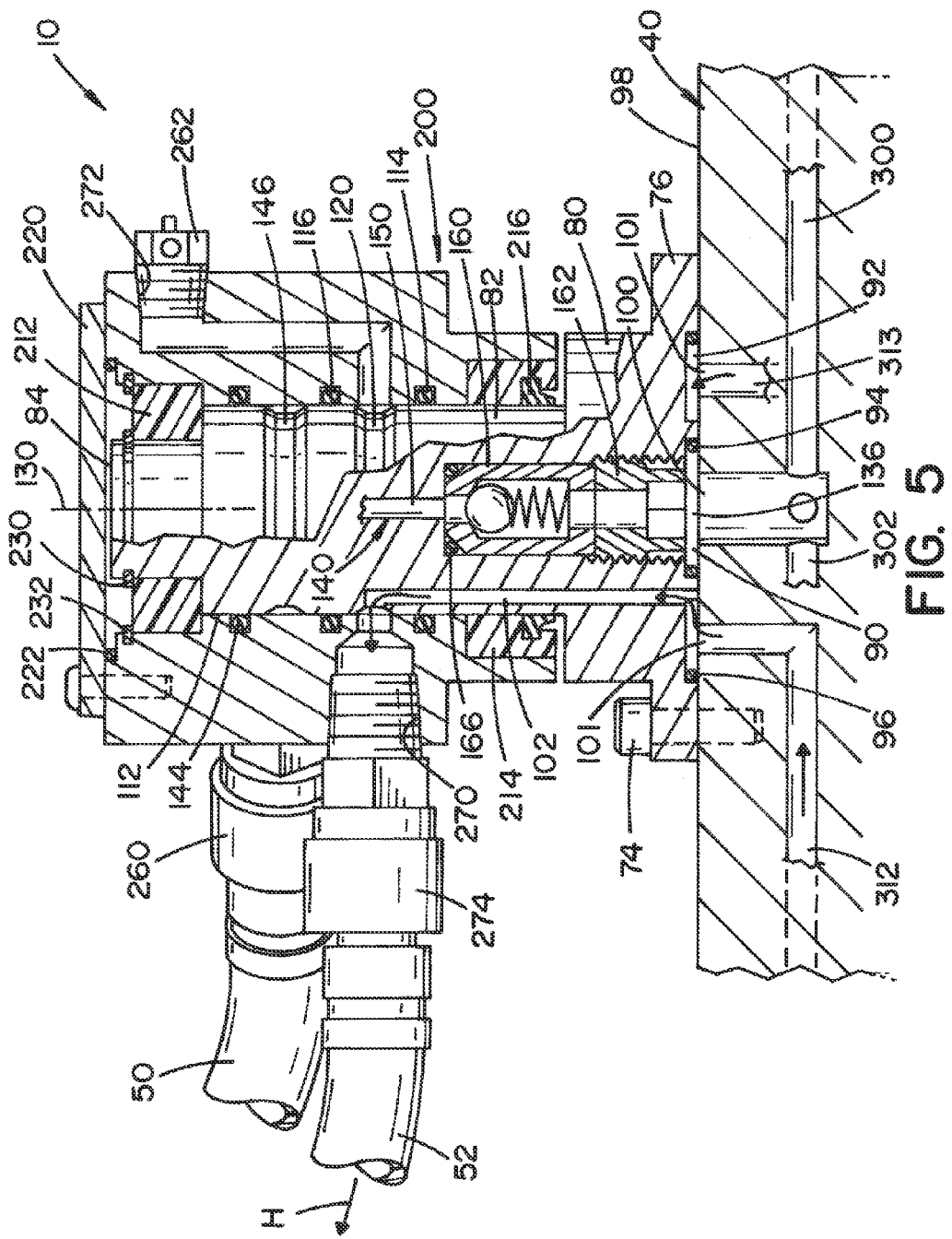
FIG. 5 is a partial sectional view of the rotary coupler and top plate shown in FIGS. 3 and 4 in a section extending through the tank line of the rotary coupler.
Figure 6:
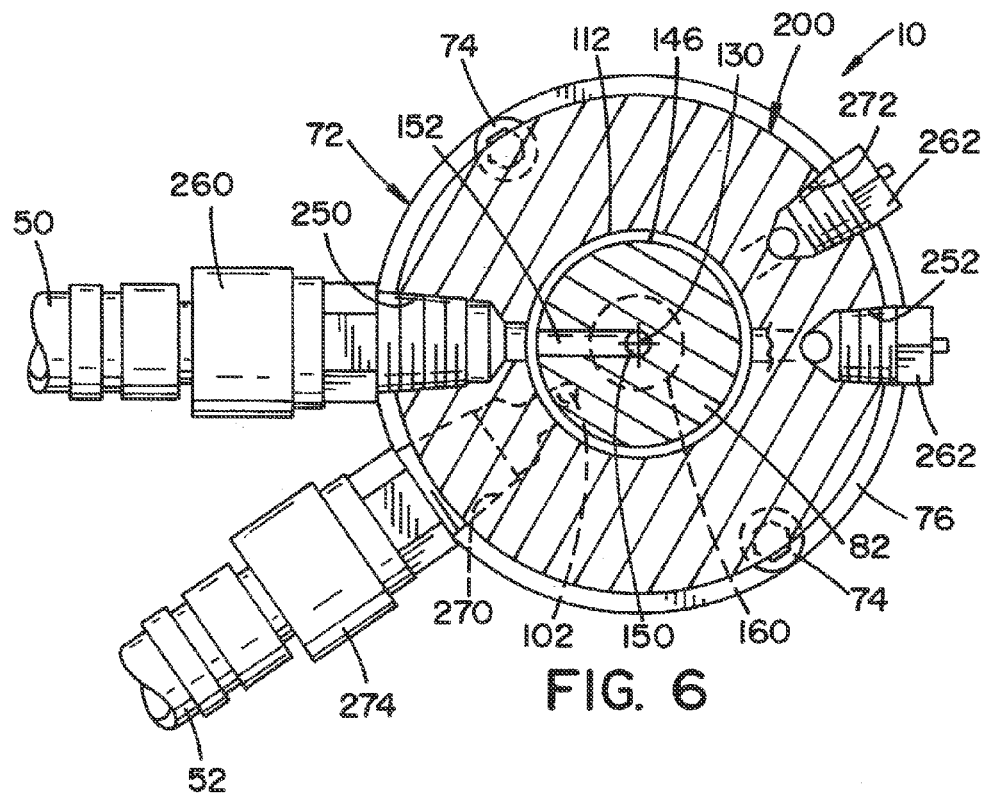
FIG. 6 is a sectional view taken along line 6-6 in FIG. 4.
Figure 7:
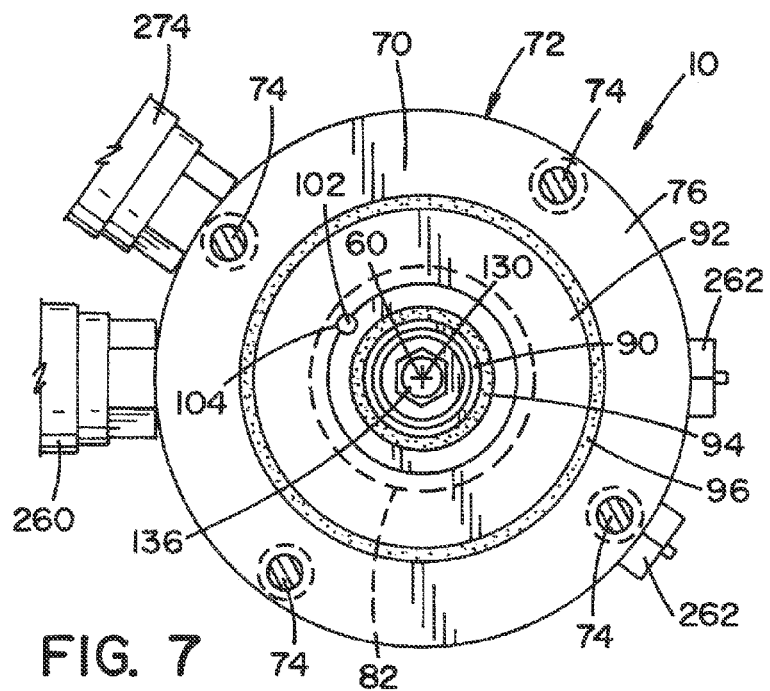
FIG. 7 is a bottom view of the rotary coupler shown in FIG. 3 taken along lines 7-7 in FIG. 4.

Referring now in greater detail to the drawings wherein the showings are for the purpose of illustrating preferred embodiments of the invention only and not for the purpose of limiting the invention, FIG. 3 shows a rotary coupler 10 positioned on a tooling fixture 20 in an assembled position such that fixture 20 could be used in connection with a machining operation (not shown). Tooling fixture 20 can be any tooling fixture known in the art without detracting from the invention of this application. However, tooling fixture 20 is shown to be a four-sided production vice column including a vertically positioned hydraulic vice or work station 22 upon each of the four sides. Each of these vices are a two station vice including a fixed center jaw 26 and two movable jaws 28 and 30 that move relative to fixed jaw 26 to clamp a workpiece therebetween. While not shown, the fixed and movable jaws can include special tooling configured to properly maintain a workpiece (also not shown) in a machining position for any one of a number of manufacturing operations. While it has been found that the invention of this application works well in connection with CNC machining, it should not be limited to any type of manufacturing operations and has a wide range of applications. Further, each of the sides of tooling fixture 20 does not need to be identical to the other side wherein different component parts could be manufactured utilizing tooling fixture 20 also without detracting from the invention of this application. However, as is shown, tooling fixture 20 is a eight station vice column arrangement.

Tooling fixture 20 can be a hydraulic fixture wherein vices 22 are hydraulic vices wherein the movement of jaws 28 and 30 are hydraulically actuated. Tooling fixture 20 can further include a top plate or manifold plate 40 which is configured to direct the hydraulic fluid flow from a source of hydraulic pressure (not shown) to one or more of the vertical vices on each side of the vice column. In that it is desirable to actuate each of the vices separate from one another, fixture 20 can further include four valves 44 which can control the hydraulic flow to a particular workholding vice. For example, valves 44 can be used to clamp a workpiece in a fixture positioned between a fixed jaw and a corresponding moveable jaw and similarly, can also be used to disengage the jaws from the workpiece. Thus, this valve can be used to load and unload parts from each of the vices in the vice column.

In order to direct the flow of hydraulic fluid from the hydraulic source to the particular vice, top plate 40 can have a plurality of passages therein which will be discussed in greater detail below. Hydraulic fluid H is pressurized by a pump (not shown) and is directed to fixture 20 by a pressure line 50. Similarly, hydraulic fluid H is then directed back to the hydraulic pump or power source by a tank line 52. This pressurized hydraulic fluid is then utilized by the tooling fixture to clamp the workpieces to be machined which will also be discussed in greater detail below.

In that tooling fixture 20 is shown to be a four-sided vice column, the fixture can be configured to rotate about a tooling axis 60 to both improve the loadability of the fixture and to reduce the complexity of the particular machining operation. In this respect, and with respect to the loading and unloading of component parts or workpieces from the fixture, an operator can stand on a side 62 of a base plate 63 and load fixture 22A with two workpieces. Once these fixtures are loaded, the operator can actuate valve 44A to clamp and hold the workpieces in place. Then, the operator can rotate fixture 20 about axis 60 to position vice 22B on side 62. Then, the operator can load fixture 22B in a similar fashion as fixture 22A was loaded. This procedure can be continued until all four sides of tooling fixture 20 are loaded with the workpieces to be machined.

Then, once all workstations are loaded, tooling fixture 20 can be positioned for the machining operation wherein, for example, the production machinery can be positioned on a side 64 of fixture 20 which is, as shown, in position to machine the workpieces on fixture 22C. Once that machining operation is completed, tooling fixture can again be rotated about tooling axis 60 so that the other workpieces on the other sides in tooling fixture 20 can be machined. As is known in the art, this rotation about axis 60 can be either a manual operation performed by the operator or an automated or semi-automated operation wherein the machining center can rotate the tooling fixture with or without input from the operator.

Once all sides of the tooling fixture have been machined, tooling fixture 20 can then be presented back to the operator who can unload the workpieces from the tooling fixture in a fashion similar to that of the loading operation. As is known in the art, the loading and unloading can take place at the same time with the use of two or more fixtures 20 to improve cycle times of the machining operation. Again, while the invention of this application is being described in connection with a machining operation, the invention of this application can be used in connection with a wide range of tooling and operations.

With reference to FIGS. 4-7, shown is rotary coupler 10 and a portion of top plate 40 according to an embodiment of the invention of this application. In greater detail, rotary coupler 10 is mounted to top plate 40 on a mounting end 70 of a spindle 72 by a plurality of fasteners 74. However, it should be noted that this securing arrangement between the coupler and the top plate can be any securing arrangement known in the art including, but not limited to, use of threaded fasteners 74 used to threadingly engage the top plate. Further, the securing arrangement can include a mounting flange 76 extending about the mounting face wherein the mounting holes extend through this mounting flange. Spindle 72 includes a base portion 80 and a shaft portion 82 wherein spindle 72 extends from mounting end 70 on base portion 80 to a distal end 84 on shaft portion 82. Base portion 80 includes both a pressure passage recess 90 and a tank passage recess 92 which are opened facing mounting end 70. In one embodiment, pressure passage recess 90 is a circular recess and which includes a seal 94 on the other circumference of the recess. Tank passage recess 92 is an annular recess and extends about pressure passage recess 360° and includes a seal 96. Seals 94 and 96 produce the necessary sealing engagement between a top plate surface 98 of top plate 40 to maintain the separate and sealed flow in the pressure line and the tank line of the hydraulic system. Further, pressure passage recess 90 is in fluid connection with one or more manifold inlets 100 of top plate 40 and tank passage recess 92 is fluid connection with one or more manifold outlets 101 to allow the flow of hydraulic fluid H to flow to and from the fixture by way of the coupler.

Spindle 72 further includes a tank passage 102 extending from tank recess 92 toward distal end 84 wherein the flow of hydraulic fluid H in tank passage is directed from a tank face opening 104 in recess 92 to a tank shaft opening 106 in a tank zone 110 that extends about an outer surface 112 of shaft portion 82 and which is partially defined by a bottom seal 114 and a mid-seal 116. Tank zone 110 includes a tank channel 120 which is an annular channel extending about a portion of outer surface 112. This channel allows the hydraulic fluid flowing through tank passage 102 to flow about a limited portion of the outer surface and which is maintained within tank zone 110. While tank channel 120 is shown to be a channel cut into shaft portion 82, this is not a requirement in the invention and is could be cut from the hub portion of the rotary coupler without detracting from the invention of this application. Further, both the hub portion and shaft 82 can include a channel for producing a desired flow of hydraulic fluid about the tank zone. Tank passage 102 can be offset from a coupler axis 130 and as shown in this embodiment, tank passage 102 is spaced near outer surface 112 of shaft portion 82. Further, while tank passage 102 is shown to be parallel to the coupler axis, this is not required for this embodiment.

Spindle 72 further includes a pressure passage 140 which extends from a pressure face opening 136 in pressure passage recess 90 towards distal end 84 and which terminates in a pressure face opening 138 pressure passage zone 142. As with tank zone 110, pressure passage zone 142 is partially defined by mid-seal 116 and is also defined by an upper seal 144 such that pressure zone 142 also extends about outer surface 112 of shaft portion 82. Pressure zone 142 can also include a pressure channel 146 that is an annular channel cut into at least one of the spindles and the hub and which extends about coupler axis 130. In that pressure passage 140 is generally centered on coupler axis 130, which is not required, passage 140 can be formed by a vertical or axial portion 150 and a horizontal or lateral portion 152. While not shown, the tank line could also include an axial and a lateral portion without detracting from the invention of this application. As a result, pressurized hydraulic fluid H which enters passage zone 142 is urged into pressure passage 140 and directed to pressure passage outlet or opening 136 in recess 90. Pressure passage 140 can further include a check valve 160 which is held in place by a plug 162. Check valve 160 can be used to limit the flow of fluid H such that it flows in a single direction which will be discussed in greater detail below. Passage 140 can further include a check valve seal 166 that can be used to seal the connection between passage 140 and the check valve to ensure that no hydraulic fluid H backflows into passage 140 which will also be discussed in greater detail below in reference to the operation of the rotary coupler.

In one embodiment, both the pressure passages and the tank passages in the shaft are spaced from the coupler axis such that neither passage is coaxial with the coupler axis. In this particular embodiment, the openings between the coupler and the top plate or manifold can be transversely spaced from one another relative to the coupler axis.

Spindle 72 and any other component of the coupler in this application can be made from any material known in the art including a wide range of metals suited for the high pressure loads associated with hydraulic pressure clamping. However, lower pressure applications increases the range of materials which can be used in connection with the rotary coupler of this application.

Rotary coupler 10 further includes a hub 200 having a hub passage or shaft opening 210 shaped to receive at least some of shaft portion 82 of spindle 72 in a sealed engagement and which allows hub 200 to rotate relative to spindle 72 about coupler axis 130 which will be discussed in greater detail below. Coupler 10 further includes an upper or top bearing 212 and a lower or bottom bearing 214 to provide the controlled relative rotation of hub 200 relative to spindle 72. Coupler 10 can further include a wiper 216 to prevent dirt or other foreign material from entering the bearing engagement between bottom bearing 214 and shaft 82 or entering any other internal components or surfaces of the coupler. In addition, coupler 10 can include a cap 220 along with a seal 222 which can be fastened to hub 200 in a sealing manner to further protect the internal workings of the coupler and the bearing engagement of top bearing 212. Coupler 10 can further include fastening devices to maintain the position of hub relative to the spindle such as retainer rings 230 and 232 wherein retainer ring 230 is positioned between shaft portion 82, near distal end 84 and top bearing 212 and retainer ring 232 is positioned between hub 200 and top bearing 212. Retainer rings 230 and 232 can be any retainer rings known in the art configured to be positioned in a ring groove of an associated part. Bearings 212 and 214 can be any bearings known in the art including, but not limited to, nylon or polymer bearings designed for reduced friction engagement between rotating parts.

Hub 200 includes a first pressure port 250 and can include a secondary pressure port 252. In this embodiment, first pressure port 250 is configured to allow a quick connect 260 to be threadingly engaged therein such that pressure line 50 can be quickly disconnected from the pressure port which will be discussed in greater detail below. Secondary pressure port 252 can be plugged with a plug 262 or can include a pressure relief valve, bleeder valve or any other hydraulic system known in the art. Further, plug 262 can be used in accordance with the operation of rotary coupler 10 to relieve hydraulic pressure to help in the disconnecting of a quick connect 260 which will also be discussed in greater detail below. Similarly, coupler 10 includes a tank port 270 and can also include a secondary tank port 272. Either of these tank ports can be configured to have a quick connect 274 attached thereto. In that quick connection joints are known in the art, this will not be discussed in greater detail in the interest of brevity. Again, the secondary tank ports can utilize a plug 262 or can utilize a pressure relief valve which can be used in the operation of coupler 10 which will be discussed in greater detail below.

In operation, when tooling fixture 20 is in position to be loaded, the operator uses quick connect 260 to connect pressure line 50 to pressure port 250. Similarly, the user connects tank line 52 to tank port 270 also using quick connect 274. Once the tank line and the pressure line are joined to coupler 10, the hydraulic fluid can pass through the coupler which directs the fluid to manifold plate 40 of fixture 20. Once in fluid connection, the operator can actuate valves 44A-44D to operate vertical fixtures 22 to load and unload the workpieces as was discussed in greater detail above. Once all of the workpieces are in position, and the fixture is ready for the machining operations, quick connects 260 and 274 can be removed from coupler 10 wherein fixture 20 can then be easily moved within the machining center. In that the pressure line includes check valve 160, the line pressure is maintained in top plate 40 thereby maintaining the clamp force on each of the fixtures within tooling fixture 20. This prevents the need for a manual valve used in connection with the coupler which was discussed in greater detail above with respect to the prior art. By eliminating the manual valve between the coupler and the top plate, several inches of height are removed from the overall coupler arrangement. As is shown, coupler 10 extends only approximately 3" above the top plate wherein the prior art device extends 10" or more above the top plate. This reduced height of the coupler assembly allows fixture 20 to be more easily positioned within a machining center. Further, coupler 10 is maintained on the top plate during the machining operations. Then, once the machining operations are completed, tooling fixture 20 is returned to the operator who then reconnects the pressure line and the tank line using quick connects 260 and 274, respectively wherein the operation can be repeated. By using the quick connects joined directly to the coupler, the management of the hydraulic lines is improved along with the reduction of the height in the coupler according to the invention of this application. Further, overhead line supports, not shown, can be used to suspend the pressure and tank lines above the operator when not in use.

Figure 8:
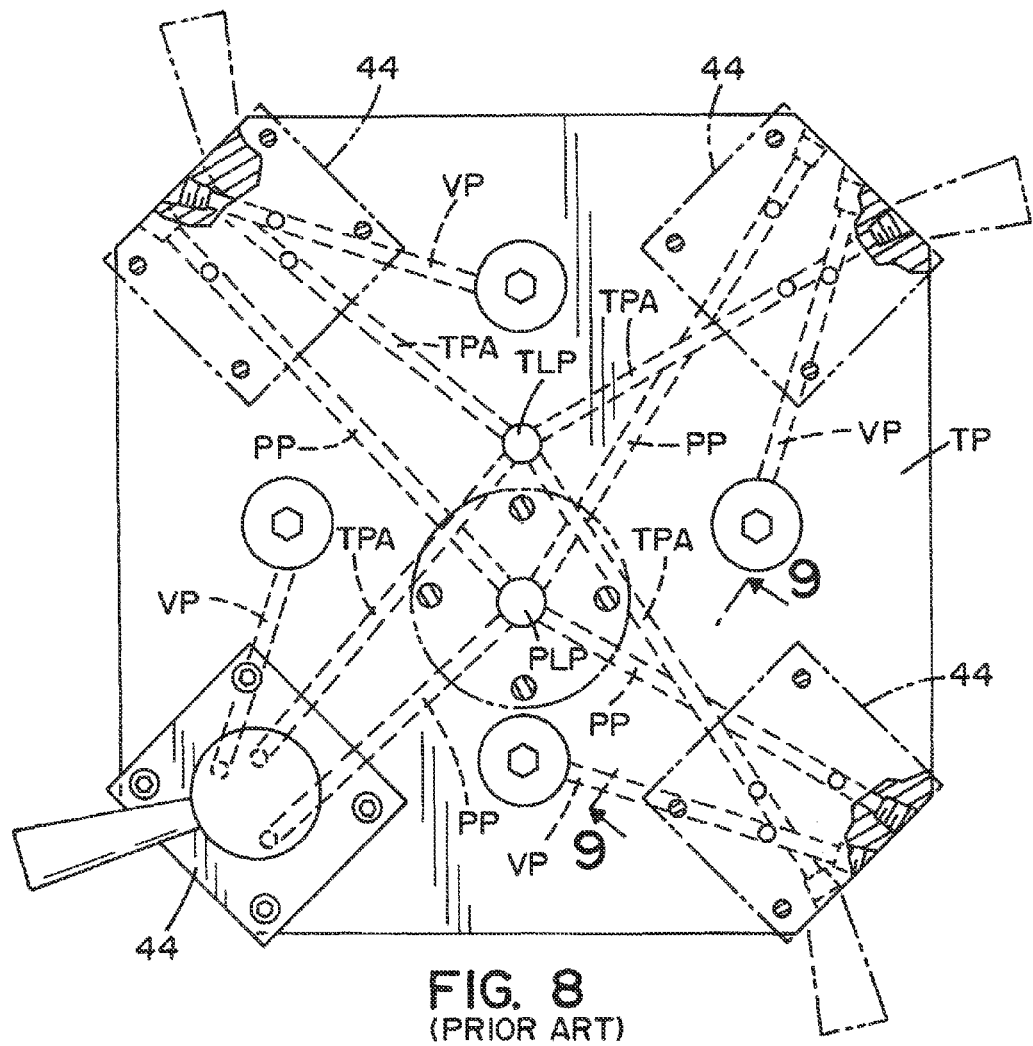
FIG. 8 is a top view of a prior art top plate used in connection with the rotary coupler shown in FIG. 1.
Figure 9:
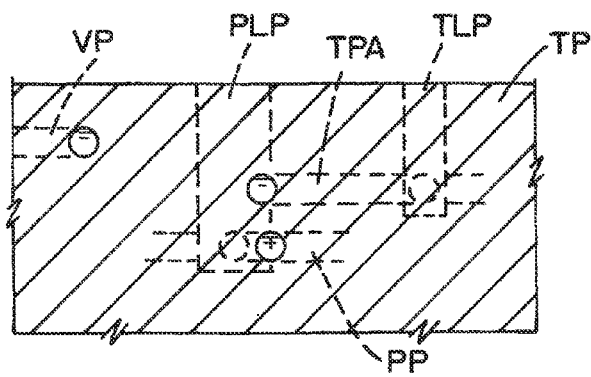
FIG. 9 is a partial sectional view taken along lines 9-9 in FIG. 8.

With reference to FIGS. 8-11, another benefit is achieved by utilizing coupler 10 according to certain embodiments of the invention of this application. In this respect, prior art coupling devices include a tank line port TLP which is off center from the tooling axis and which is joined to tank line connector TLC. Further, this port is spaced on one side of a pressure line port PLP of the prior art device which is joined to a pressure line connector PLC. As is best shown in FIG. 8, this results in the pressure passages PP overlapping the tank passages TPA which makes the manufacture of top plate TP more difficult and costly. In this respect, by having hydraulic lines that pass over one another, more care must be taken to drill these passages to ensure that they do not inadvertently intersect each other. Further, the top plate or manifold must be thicker to allow these different planes of passages to pass therethrough.

Figure 11:
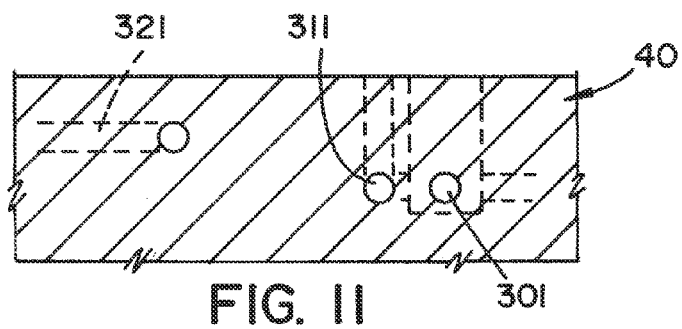

However, by utilizing a coupler according to certain aspects of the invention of this application, these passages and the manufacturing thereof can be greatly simplified. In this respect, by utilizing annular tank port recess 92, top plate 40 can include pressure passages 300-303 that do not pass over or under tank passages 310-313 such that the tank passage and the pressure passages can be drilled in the same plane which is best shown in FIG. 11. Further, these passages can be made parallel to one another such that the likelihood of a tank passage inadvertently being machined into a pressure passage is greatly reduced. This simplified drilling arrangement greatly reduces the cost associated with top plate 40 and can also reduce the necessary thickness of this top plate which also reduces cost and reduces the weight associated with fixture 20. In addition, it can further reduce the complexity and drilling and the other passages such as valve passage VP shown in the prior art and valve passage 320-323.

Figure 10:
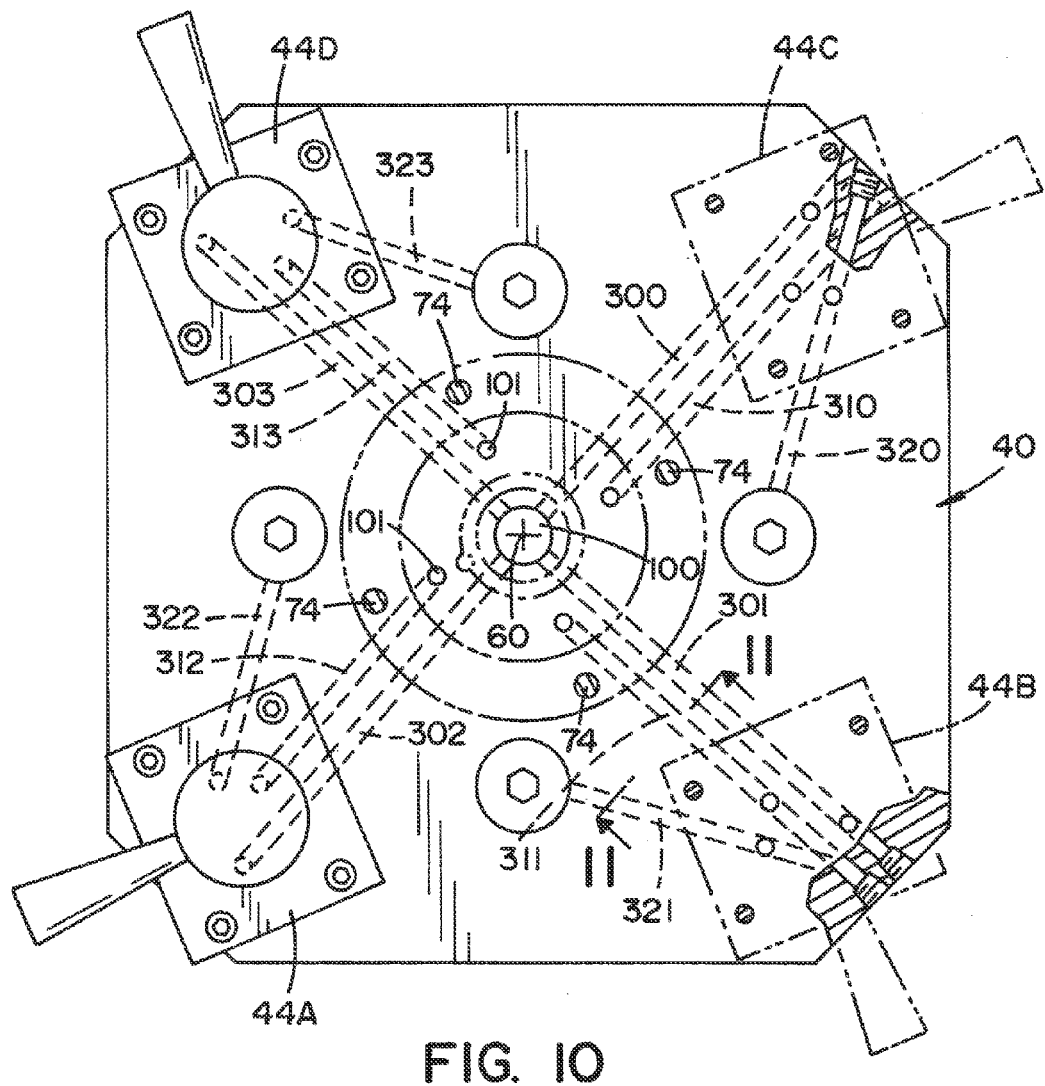
FIG. 10 is a top view of a top plate according to the present invention as is shown in FIG. 3; and, FIG. 11 is a partial sectional view taken along lines 11-11 in FIG. 10.

As is best shown in FIG. 10, even though manifold 40 includes a plurality of manifold outlets positioned about the fixture axis, they all align with the annual tank recess thus a single tank opening in coupler 10 can be used to receive this flow of hydraulic fluid from the tank passages.

In one embodiment, the pressure lines and the tank lines are generally in the same plane. In another embodiment, this plane is generally transverse to the fixture axis. In yet another embodiment, the pressure lines are circumferentially spaced from the corresponding tank line along its entire length. In yet another embodiment, the pressure lines do not pass over or under any of the tank lines. In yet another embodiment, each of the pressure lines is in a different transverse plane than each of the tank lines for their respective lengths.

While considerable emphasis has been placed on the preferred embodiments of the invention illustrated and described herein, it will be appreciated that other embodiments and/or equivalents thereof can be made and that many changes can be made in the preferred embodiments without departing from the principles of the invention. Accordingly, it is to be distinctly understood that the foregoing descriptive matter is to be interpreted merely as illustrative of the invention and not as a limitation.

The invention claimed is:

1. A system for selectively directing a fluid flow between a supply of pressurized fluid, a plurality of fixtures and a fluid tank, the plurality of fixtures being rotatable about a fixture axis and each fixture of the plurality of fixtures being selectively actuateable between an opened condition and a closed condition wherein the plurality of fixtures selectively secure work pieces when in the closed condition, said system comprising: a coupler and a manifold plate, said coupler having a spindle including a base portion and a shaft portion and which extends in an axial direction from a mounting end on said base portion and a distal end on said shaft portion, said base having a mounting face and a securing arrangement configured to secure said mounting face to a manifold surface of said manifold plate such that said mounting face sealingly engages with said manifold surface of said manifold plate and is fixed relative to said manifold plate, said shaft portion defining a coupler axis and having a shaft surface generally coaxial to said coupler axis, said shaft surface including an annular pressure zone and an axially spaced annular tank zone, said spindle further including an internal pressurized fluid passage and an internal tank fluid passage, said pressurized passage extending within said spindle between a pressurized face opening in said mounting face and a pressurized shaft opening in said pressure zone, said tank passage extending within said spindle between a tank face opening in said mounting face and a tank shaft opening in said tank zone, at least one of said manifold surface and said mounting face including an annular tank recess and said tank face opening being disposed within said tank recess such that fluid flow reaching said tank recess is directed into said tank passage; said coupler further including a hub having a shaft opening shaped to receive said shaft portion of said spindle such that said spindle is rotatable within said hub about said coupler axis relative to said hub, at least one of said hub and said shaft including an annular pressure zone channel in said pressure zone allowing the pressurized fluid to flow about said shaft in said pressure zone, at least one of said hub and said shaft including an annular tank zone channel in said tank zone allowing the tank fluid to flow about said shaft in said tank zone, said coupler further including a seal separating said tank zone from said pressure zone, said hub having a pressure port and a tank port, said pressure port being in fluid connection with said pressure zone and said tank port being in fluid connection with said tank zone; said coupler further including a bearing arrangement between said spindle and said hub; said manifold plate having a manifold inlet in fluid communication with said pressurized face opening when said coupler is mounted to said manifold plate in a mounted condition for receiving an associated pressurized fluid from said pressurized face opening and said manifold plate further including a plurality of manifold outlets spaced from one another about said fixture axis, said plurality of manifold outlets being in fluid connection with said annular tank recess when said coupler is mounted to said manifold plate in said mounted condition, said manifold plate further including a control valve for the each associated fixture of the associated plurality of fixtures, said control valve configured for the selective directing of the associated fluid flow to actuate the each associated fixture between the opened condition and the closed condition.

2. The system of claim 1, wherein said pressurized passage includes a check valve between said pressurized face opening in said mounting face and said pressurized shaft opening in said pressure zone thereby limiting fluid flow from said face opening to said shaft opening.

3. The system of claim 1, wherein said manifold plate further includes a corresponding plurality of pressure lines each extending radially from said manifold inlet toward one of said control valves of said plurality of fixtures and a corresponding plurality of tank lines each extending from one of said plurality of manifold outlets in said annular tank recess to one of said control valves of said plurality of fixtures, said plurality of pressure lines and said plurality of tank lines being generally in the same plane and the pressure line and the tank line for each of said plurality of fixtures being parallel to one another.

4. The system of claim 3, wherein said same plane is generally transverse to said fixture axis.

5. The system of claim 1, wherein said manifold plate further includes a corresponding plurality of pressure lines each extending radially from said manifold inlet toward one of said plurality of fixtures and a corresponding plurality of tank lines each extending from one of said plurality of manifold outlets to one of said plurality of fixtures, said plurality of pressure lines not passing over or under said plurality of tank lines.

6. The system of claim 5, wherein said plurality of pressure lines and said plurality of tank lines are generally in the same plane.

7. The system of claim 1, wherein said spindle is a unified machined component, said pressurized passage of said spindle includes an axial pressure passage portion and a lateral pressure passage portion, said axial pressure passage portion extending axially and coaxially with said coupler axis from said pressurized face opening and being in fluid connection with said lateral pressure passage which extends inwardly from said pressurized shaft opening, said tank passage of said spindle includes an axial tank passage portion and a lateral tank passage portion, said axial tank portion extending axially but being radially spaced from said coupler axis and said axial pressure passage, said tank face opening being in fluid connection with said lateral tank passage which extends inwardly from said tank shaft opening.

8. The system of claim 7, wherein said annular tank recess is an annular groove in said mounting face, said plurality of manifold outlets being aligned with said annular groove when said coupler is in said mounted condition.

9. The system of claim 7, wherein said spindle further includes a check valve in said pressurized passage positioned between said pressurized face opening in said mounting face and said pressurized shaft opening in said pressure zone thereby limiting fluid flow from said face opening to said shaft opening.

10. The system of claim 1, wherein said spindle is a unified machined component, said mounting face further includes a first and a second recess formed therein with a seal between said first and second recesses, said pressurized face opening being disposed in said first recess and said tank face opening being disposed in said second recess.

11. The system of claim 10, wherein one of said first and second recesses is an annular recess extending about the other of said first and second recesses.

12. The system of claim 11, wherein said seal is a first seal and said first seal being positioned in said first recess, said coupler further including a second seal and said second seal being positioned in said second recess, said sealing engagement between said mounting face and the associate manifold plate being formed by said first and second seals.

13. The system of claim 10, wherein, said second recess covers said plurality of manifold outlets.

14. The system of claim 2, wherein said tank port and said pressure port include quick disconnect fittings.

15. The system of claim 1, wherein said tank face opening is a single tank face opening.

* * * * *